United States Patent
Mizota et al.

(10) Patent No.: US 7,460,964 B2
(45) Date of Patent: Dec. 2, 2008

(54) FORCE VECTOR RECONSTRUCTION METHOD USING OPTICAL TACTILE SENSOR

(75) Inventors: Terukazu Mizota, Yamatokohriyama (JP); Kazuto Kamiyama, Maebashi (JP); Hiroyuki Kajimoto, Yokohama (JP); Naoki Kawakami, Tokyo (JP); Susumu Tachi, Tsukuba (JP)

(73) Assignee: Toudai TLO, Ltd., Tokyo (JP)

( * ) Notice: Subject to any disclaimer, the term of this patent is extended or adjusted under 35 U.S.C. 154(b) by 0 days.

(21) Appl. No.: 10/571,371

(22) PCT Filed: Sep. 10, 2004

(86) PCT No.: PCT/JP2004/013203

§ 371 (c)(1),
(2), (4) Date: Mar. 9, 2006

(87) PCT Pub. No.: WO2005/029027

PCT Pub. Date: Mar. 31, 2005

(65) Prior Publication Data

US 2007/0043508 A1    Feb. 22, 2007

(30) Foreign Application Priority Data

Sep. 16, 2003  (JP)  ............................. 2003-322627
Jun. 16, 2004  (JP)  ............................. 2004-177794

(51) Int. Cl.
*G01L 1/06* (2006.01)
*G01L 7/02* (2006.01)
*G01L 11/02* (2006.01)

(52) U.S. Cl. ...................... 702/41; 702/33; 702/138; 73/762; 73/800

(58) Field of Classification Search .................. 702/33, 702/41–44, 101, 102, 109, 113, 114, 138, 702/140, 167, 173; 382/107, 121, 123, 152, 382/154; 250/231.11, 231.19; 73/760, 762, 73/767, 768, 774, 800
See application file for complete search history.

(56) References Cited

U.S. PATENT DOCUMENTS 5,033,102 A * 7/1991 Nakajima et al. ............ 382/282
5,058,190 A * 10/1991 Levitt et al. .................. 382/324
6,909,084 B2 * 6/2005 Tachi et al. ................... 250/221

FOREIGN PATENT DOCUMENTS

| JP | 11-108630 | 4/1999 |
| JP | 11-118625 | 4/1999 |
| WO | 02/18893 A1 | 3/2002 |
| WO | WO 02/18893 A1 * | 3/2002 |
| WO | WO 0218893 A1 * | 3/2002 |

* cited by examiner

*Primary Examiner*—Manuel L Barbee
(74) *Attorney, Agent, or Firm*—Ladas & Parry LLP

(57) ABSTRACT

The invention relates to a technique for reducing computation time for force vector calculation. A force vector reconstruction method that uses an optical tactile sensor, comprises a step for obtaining a marker image by taking an image of behavior of colored markers when an object contacts a contact surface of an elastic body, a step of obtaining information relating to the marker behavior from the marker image, the information being more than the number of force vectors to be obtained, and a step of obtaining force vectors as outputs by inputting information relating to the obtained marker behavior to a transfer function. The step of obtaining force vectors comprises calculating force vectors using only information relating to behavior of markers neighboring region A1 of a position A where it is desired to obtain force vectors.

10 Claims, 7 Drawing Sheets

● ○ : Force Sampling Points
● : Computational Results used after computation

FIG.10

$n_j, m_k$: Movement Vector of Observed Marker $F_i$: Force Vector

FIG.11

$n_j, m_k$: Movement Vector of Observed Marker

$F_i$: Force Vector

FIG.12

○ : Marker (Movement information is not used)
$n_j, m_k$: Movement Vector of Observed Marker
$F_i$: Force Vector

FIG.13

○ : Marker (Movement information is not used)
$n_j, m_k$: Movement Vector of Observed Marker
$F_i$: Force Vector

US 7,460,964 B2

FORCE VECTOR RECONSTRUCTION METHOD USING OPTICAL TACTILE SENSOR

FIELD OF THE INVENTION

The present invention relates to an optical tactile sensor, and particularly to a method of reconstructing force vector using the optical tactile sensor.

BACKGROUND OF THE INVENTION

Figure 1:
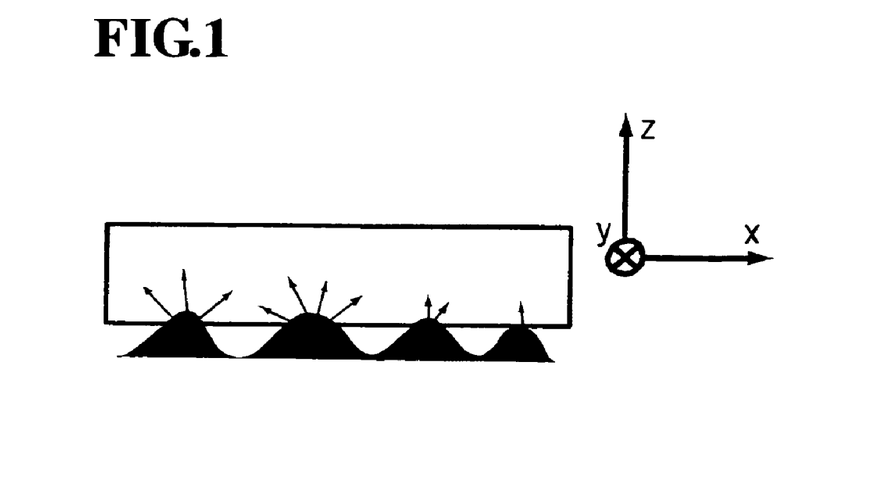
FIG. 1 is a view showing force vector distribution exerted between a tactile sensor and an object to be contacted.

When considering understanding the contact state of a contact surface using a tactile sensor, there are vectors of three components representing magnitude and direction of force acting at each point of the contact surface. This is represented as f(x,y) in the coordinate system of FIG. 1. Here, f is a vector, and so actually has three components x, y and z at each point. When explicitly expressing each component, it is represented as f(x,y)=[fx(x,y), fy(x,y), fz(x,y)]. Since force distribution has three components at each contact point, in order to reconstruct force distribution for each contact surface using a tactile sensor, it is necessary to acquire information for each contact point on the contact surface with at least three degrees of freedom.

Some of inventors of the present invention et al. have proposed an optical tactile sensor that is capable of measuring three-dimensional force vector distribution. A principle of the optical tactile sensor will be explained based on FIG. 2. The optical tactile sensor comprises a transparent elastic body and a CCD camera. By photographing spherical markers 3, 4 embedded in the transparent elastic body by the CCD camera, internal strain information of the elastic body is measured when a force is applied on the surface of the elastic body, and force vector distribution is reconstructed from the information.

Figure 2:
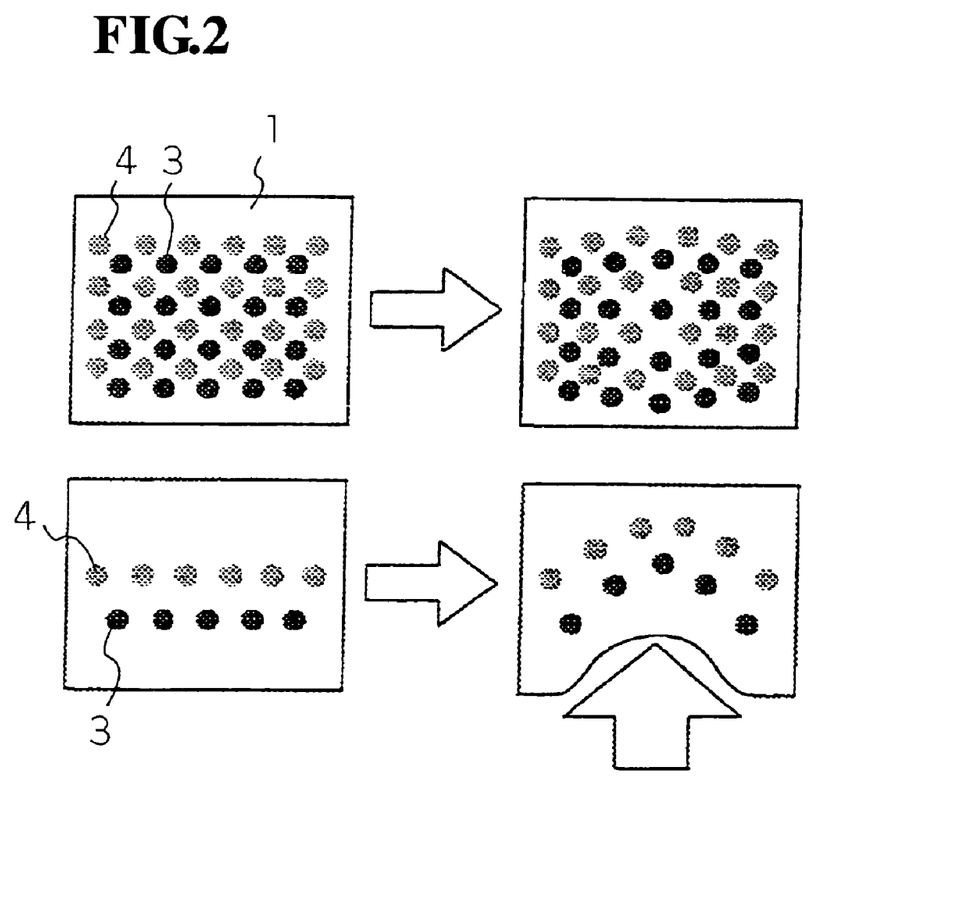
FIG. 2 is a drawing showing the principle of an optical tactile sensor. The upper diagram is a plane view (CCD image) of a transparent elastic body, while the lower diagram is a side view of the transparent elastic body. The transparent elastic body has two kinds of marker groups embedded therein. When force is applied to the transparent elastic body from beneath, the marker moves from what is shown in the left diagram to what is shown in the right diagram.

By taking an image of the spherical markers by a CCD camera from z-direction where an elastic body surface is taken as the x-y plane and an orthogonal direction to the x-y plane is taken as the z-axis, movement of a point to be measured when force is applied is measured as a movement vector in the x-y plane. However, it is difficult to reconstruct the force vector distribution from the strain information because an amount of information is insufficient. Therefore, N×N red spherical markers and blue spherical markers are arranged at different depths in the elastic body as points to be measured to obtain two sets of two-dimensional movement vectors with different depths as two pieces of different information, thereby increasing the amount of information to reconstruct the force vector distribution.

However, computation time required to obtain force vectors becomes long in proportion to four times the size (amount of information relating to behavior of markers) of the contact surface constituting the sensor surface. Thus, the computation time is longer with a larger contact surface, and there is a possibility of not being able to perform real time sensing. Also, even if the sensor surface has a relatively small surface area, if measurement density is high, the amount of information relating to behavior becomes high, time required for calculation of force vector distribution becomes long and it is not possible to perform real time sensing. Accordingly, when implementation and application of an optical tactile sensor are considered, shortening calculation time for obtaining force vector distribution is an important problem.

Patent Reference: WO02/18893A1

An object of the present invention is to provide a technique for reducing computation time for force vector calculation, even in the event that a sensor contact surface comprises a large surface area or measurement density of the contact surface is high.

SUMMARY OF THE INVENTION

Technical means adopted by the present invention to achieve the object is characterized by a force vector reconstruction method that uses an optical tactile sensor. The method comprises a step of obtaining a marker image by taking an image of behavior of colored markers when an object contacts a contact surface of an elastic body, a step of obtaining information (for example, a movement vector, which is one example of movement information of the marker) relating to the marker behavior from the marker image, the information being more than the number of force vectors to be obtained, and a step of obtaining force vectors as outputs by inputting obtained information relating to the marker behavior to a transfer function, wherein the step of obtaining the force vectors calculates force vectors omitting information relating to behavior of the marker that has low extent of contribution to force vector calculation. For example, if a distance between a force application point and a marker is a sufficient distance, in the force vector calculation, the effect of a marker distanced from the force application point is considered insufficient, and a distanced marker is considered to offer low level of contribution to force vector calculation.

In one preferred aspect, a step of obtaining force vectors calculates force vectors using only information relating to behavior of markers in the vicinity of a position where it is desired to obtain force vectors. By using only marker information in the vicinity of a desired position, it is possible to make a matrix, which is a transfer function, compact. In the matrix, by making an element of the matrix reflecting marker information for a position greater than a particular distance from the desired marker zero, it is possible to lighten computation of the matrix. In another preferred aspect, the step of obtaining force vectors calculates force vectors omitting elements that are close to zero in elements of the matrix. In doing this, similarly, it is possible to lighten matrix computation.

In another preferred embodiment, a position where force vectors are to be obtained are comprised of one or more sampling points, and in addition, a plurality of sampling points are arranged around sampling points constituting the position where force vectors are to be obtained. Force vectors acting at the plurality of force sampling points at and around the position where it is desired to obtain the force vectors are respectively calculated using information relating to marker behavior in the vicinity of the position. Only force vectors acting at the position where force vectors are to be obtained are adopted in the calculated force vectors. Preferably, the sampling points are more arranged sparsely as separation from the position where the force vectors to be obtained.

In another preferred aspect, a force vector reconstruction method comprises a step for obtaining a marker image by taking an image of behavior of colored markers when an object contacts a contact surface of an elastic body, a step of obtaining information relating to the marker behavior from the marker image, the information being more than the number of obtained force vectors, and a step of obtaining force vectors acting on the contact surface from obtained information relating to behavior of the markers and a transfer function, wherein the step of obtaining the force vectors comprises a step of setting a small region of a specified size in the marker image and arranging a plurality of force vector sampling points inside and outside the small region, a step of calculating force vectors acting on the plurality of sampling points from marker information inside the small region and the transfer function, and a step of adopting force vectors acting on at least some sampling points of the plurality of sampling points arranged inside the small region. Preferably, the sampling points are arranged densely inside the small region, and arranged sparsely with distance from the small region.

In one preferable aspect, the present invention is provided by the a force vector reconstruction device comprising: means for obtaining a marker image by taking an image of behavior of colored markers when an object contacts a contact surface of an elastic body; means for obtaining information relating to the marker behavior from the marker image, the information being more than the number of obtained force vectors; means for setting a small region of a specified size in the marker image and arranging a plurality of force vector sampling points inside and outside the small region; means for calculating force vectors acting on the plurality of sampling points by supplying marker information inside the small region to a transfer function; and means for adopting force vectors acting on at least some sampling points of the plurality of sampling points arranged inside the small region.

Further, the present invention provides a program for causing a computer constituting a force vector reconstruction device as: means for obtaining a marker image by taking an image of behavior of colored markers when an object contacts a contact surface of an elastic body; means for obtaining information relating to the marker behavior from the marker image, the information being more than the number of obtained force vectors; means for setting a small region of a specified size in the marker image and arranging a plurality of force vector sampling points inside and outside the small region; means for calculating force vectors acting on the plurality of sampling points by supplying marker information inside the small region to a transfer function; and means for adopting force vectors acting on at least some sampling points of the plurality of sampling points arranged inside the small region.

An optical tactile sensor comprises a tactile portion comprised of a transparent elastic body and a plurality of groups of markers provided inside the elastic body, each marker group being made up of a number of colored markers, with markers making up different marker groups having different colors for each group. At least one of displacement, strain and inclination of the colored markers when the elastic body contacts an object is observed by photographing behavior of the colored markers. Strain information inside the transparent elastic body is detected from information about the behavior colored markers when a contact object touches the sensor, and the shape of the contact object calculated from strain information, and information about force acting on a contact interface (including both the elastic body surface and the contact object surface) are also detected. According to the present invention, it is possible to separately collect a plurality of types of information with a simple method called "color coding", and it is possible to acquire a plurality of types of tactile information at the same time with an optical system. According to the present invention, independent observed information whose number is equal to or greater than the number of unknowns are collected using color coding, and it is possible to estimate and reconstruct force vectors by stably resolving an inverse problem.

The colored markers are photographed by photographing device, in a preferred example, a CCD camera, and image processing is carried out by a processor. For example, an image at the time of body contact and an image of a previous condition (a condition where external force is not acting on the transparent elastic body) are compared, and movement information of markers (movement vector, for example) is detected. Alternatively, the markers are embedded in the transparent elastic body in such an arrangement that they can not be recognized normally (in a state where external force is not acting on the transparent elastic body), and a configuration is such that markers are recognized in response to displacement deformation and inclination of markers caused by strain in the vicinity of positions where each of the markers exist when an object contacts the transparent elastic body, and information is detected from the appearance of the colored markers. In another preferable aspect, the behavior of markers (step-like strip markers, for example) can be obtained by variance of marker intensity.

The optical tactile sensor stores a transfer function by which force vectors or force vector distribution applied to the surface of the elastic body are reconstructed from information (movement vectors of each marker when an object contacts the surface, for example) obtained by photographing device as to behavior of markers. The transfer function is a function that associates force information applied to the surface of the sensor with information as to the behavior of markers (movement vectors, for example). The image information of markers is obtained by photographing the colored markers when the object contacts the sensing surface of the elastic body, and the information as to the behavior of markers is obtained from the image information of markers. The force vector is obtained as an output by inputting the obtained information to the transfer function. The number of information as to the behavior of markers that is input to the transfer function is more than the number of force vectors to be obtained.

Methods for obtaining the matrix constituting the transfer function include computation based on the Theory of elasticity, actual measurement, and simulation.

In one preferred aspect, the imaging device is arranged at a position opposite to the side of the transparent elastic body contacted by the object. Also, in the case where there exists a plurality of colored markers having different colors from each other, it is desirable to carry out convenient processing after imaging by selecting only markers of a particular color and looking at them separately. Selection of a particular color marker is carried out by, for example, using a color filter. It is desirably to provide a light shielding layer on the sensing surface to stabilize an image of markers.

An arrangement of markers will be explained. In one preferred embodiment, a plurality of groups of markers are embedded in the transparent elastic body, each group of markers being made up of a large number of markers, markers constituting different marker groups having different colors for each group, and the marker groups having a different spatial arrangement. As an example of this differing spatial arrangement, a plurality of marker groups are arranged in a layered manner inside the elastic body. As an example of layered markers, the markers constituting the marker groups are microscopic spherical particles and the spherical markers constituting the marker group for each layer have different colors from each other. As another example of this differing spatial arrangement, a plurality of marker groups are arranged so as to intersect each other. As still another example of this differing spatial arrangement, each marker group is a plane group comprised of a plurality of planes extending in the same direction, and extending directions and colors thereof are different between each marker group. The shape of the colored markers is not particularly limited, and preferable examples can be spherical, cylindrical, columnar, strip shaped or flat. Detail description of the markers is described in WO02/18893 A1 and incorporated herein by reference. Further, the shapes and/or arrangements of markers are not limited to the drawings of the present application and WO02/18893 A1.

According to the present invention, it is possible to make the size of a matrix, being a transfer function for calculating force vectors, small, and it is possible to shorten the computation time in calculating force vectors. It therefore becomes possible to carry out real time sensing even if a sensor is provided with a large area contact surface.

DETAILED DESCRIPTION OF THE PREFERRED EMBODIMENT

[A] Construction of Optical Tactile Sensor

Figure 3:
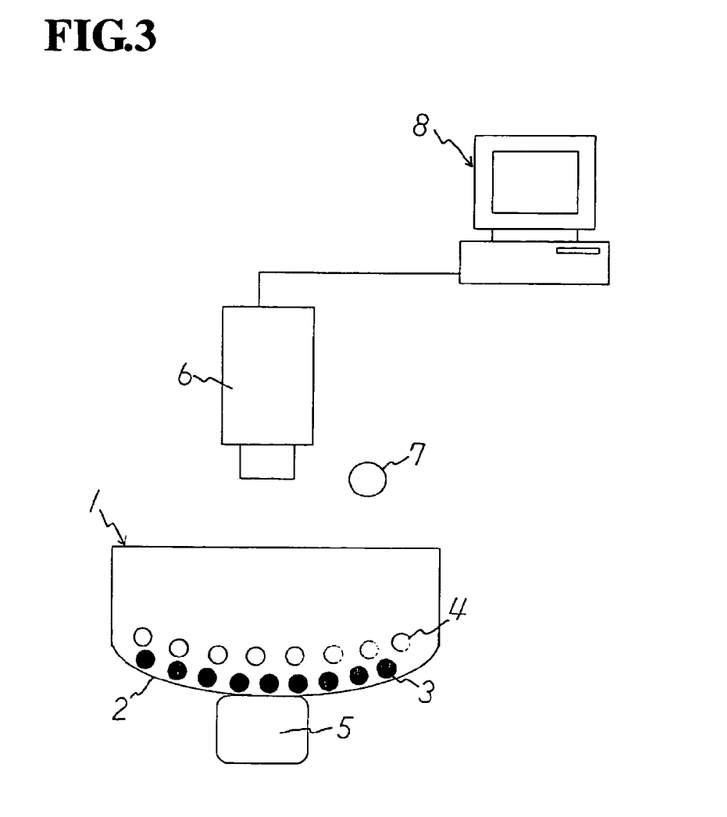
FIG. 3 is a schematic drawing of an optical tactile sensor of the present invention.

Referring to FIG. 3, the construction of an optical tactile sensor of the present invention is shown. The sensor comprises a transparent elastic body 1 formed of a transparent elastic material and a curved surface 2, or a surface for sensing. The transparent elastic body 1 is provided with a plurality of colored markers 3, 4 embedded in the transparent elastic body 1 in the vicinity of the surface 2 and along the curved surface 2. A tactile section is comprised of the transparent elastic body 1 and the colored markers 3, 4 arranged inside the elastic body. The transparent elastic body 1 is preferably made of silicone rubber, but it can also be made from another elastic material such as the other types of rubber or elastomer.

The colored markers 3, 4 are comprised of two groups of colored markers and the two marker groups are embedded in different depths respectively from the surface 2. Colored markers 3 constituting one marker group and colored markers 4 constituting the other marker group have different colors to each other. For example, one marker group consists of a plurality of blue markers 3 and the other marker group consists of a plurality of red markers 4.

When an object 5 comes into contact with the transparent elastic body 1, the colored markers 3, 4 provided inside the transparent elastic body 1 are moved due to the internal strain of the elastic body. The sensor is also provided with a camera 6 as a photographing device and a light source 7. The optical camera 6 is arranged at a position on an opposite side to where an object 5 touches so that the transparent elastic body 1 is provided between the optical camera 6 and the object 5, and behavior or movement of the markers 3, 4 is photographed by the camera 6. The light source 7 may transmit light through a waveguide such as an optical fiber for example. Images of markers 3, 4 obtained by the photographing device are transmitted to a computer 8 and the marker images are displayed on a display. The processor of the computer 8 calculates the marker information (movement vectors as movement information, for example) regarding the behavior (displacement, strain or inclination) of markers. The processor reconstructs the distribution of forces applied to the surface 2 by an object 5 using the marker information (movement information, for example) and a transfer function that is stored in the memory device of the computer 8.

A camera, as a photographing device, is a digital camera, namely a camera for outputting image data as electrical signals, and in one preferred example is a CCD camera. It is also possible to use, for example, a digital camera using a C-MOS type image sensor. If three types of markers are prepared in red, green and blue, there are two methods of perceiving these three colors individually. The first method is to use color filters for separation where each marker can be regarded as being individually photographed directly by looking at RGB output from the camera. The second method is a method where imaging elements perceive only light intensity and light sources of red green and blue are prepared. When red is shone, light is only reflected from the red markers while the red light is absorbed by the markers of the other two colors, and so the camera effectively only perceives the red markers. If this is also carried out at separate times for green and blue, information equivalent to that using the first method can be acquired.

[B] Method of Reconstructing Force Vector Distribution on Contact Surface

Figure 4:
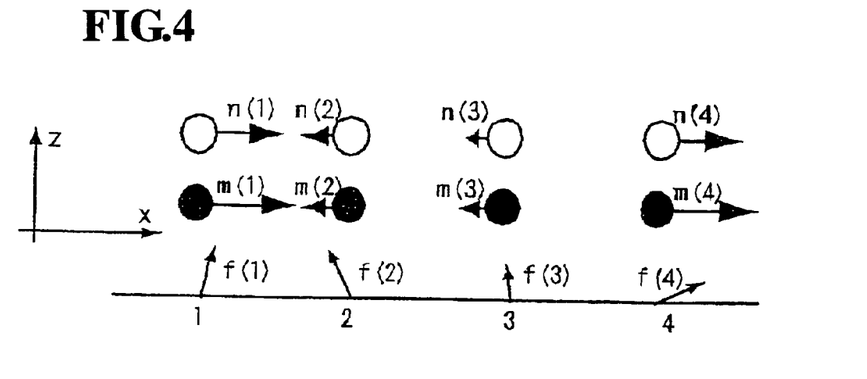
FIG. 4 is a diagram explaining a force vector applied to a contact surface (plane surface) and movement of the marker.
Figure 5:
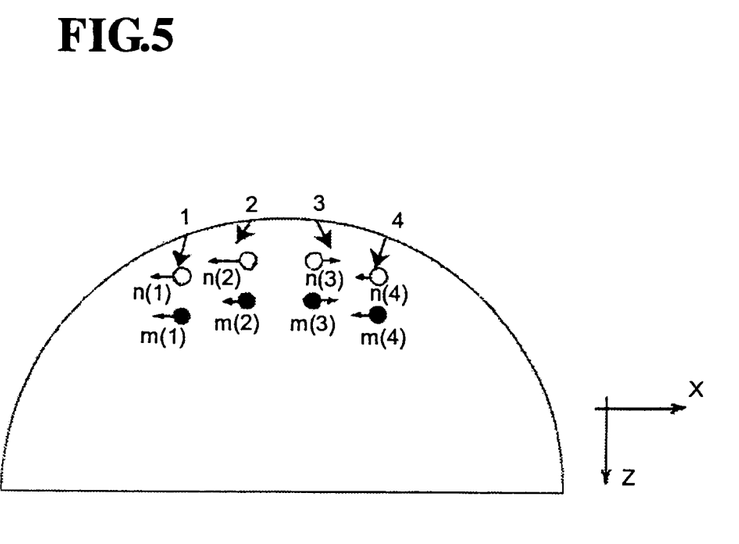
FIG. 5 is a diagram explaining a force vector applied to a contact surface (arbitrary curved surface) and movement of marker.

To obtain force vector distribution applied to a surface of the sensor from obtained information (movement vectors of markers, for example) as to behavior of markers by an optical tactile sensor, a transformation from information (movement information, for example) M as to the behavior of markers to force information F is required. The transformation from the marker information M to the force information F is obtained by an equation F=HM. Referring to FIG. 4 and FIG. 5, a method of reconstructing the force vector distribution from the marker information will now be described based on a method of obtaining the force vector distribution from the movement vectors of markers. FIG. 4 and FIG. 5 are substantially the same except that FIG. 4 shows a plane sensing surface while FIG. 5 shows an arbitrary curved sensing surface. Here, though, for the purpose of simplification, only two-dimensional section (y-axial direction is omitted) is considered, an algorithm is the same for a general three-dimensional space.

Reference f refers to a force vector applied to a contact surface, and references m and n refer to a movement vector of a blue marker and movement vector of a red marker in the CCD element. Discrete finite points (four points in FIG. 4 and FIG. 5) are considered. As foregoing, force vector distribution has three components (x component, y component and z component), but only two components (x component and z component) are considered. Generally, taking an image by a camera means a projection of a three-dimensional object to a pixel plane of a two-dimensional plane so that marker movements only in the horizontal direction (x component and y component) are projected in the plane. Here, marker movement only in x direction component is observed.

Here, eight components, f=[fx(1), fx(2), fx(3), fx(4), fz(1), fz(2), fz(3), fz(4)] are force vector distribution to be obtained, where m=[m(1), m(2), m(3), m(4)] and n=[n(1), n(2), n(3), n(4)] are movement vectors to be measured. The vectors m and n are represented as X. Namely, X=[m(1), m(2), m(3), m(4), n(1), n(2), n(3), n(4)]. Here, movement vectors m and n that are observed when a unit force (magnitude of 1) in the x-direction is applied to a point 1 are represented as Mx(1).

Namely, Mx(1)=[m(1), m(2), m(3), m(4), n(1), n(2), n(3), n(4)] when f=[1, 0, 0, 0, 0, 0, 0, 0]. Similarly, a movement vector of each marker when a unit force in the z-direction is applied to a point 1 are represented as Mz(1), a movement vector of each marker when a unit force in the x-direction is applied to a point 2 are represented as Mx(2), and so on. In case of a linear elastic body where linear summation relationship holds between applied forces and strains (most elastic bodies meet this characteristics), movement vectors are represented as X=Mx(1)×fx(1)+Mz(1)×fz(1)+Mx(2)×fx(2)+ . . . +Mz(4)×fz(4), when general forces f=[fx(1), fx(2), fx(3), fx(4), fz(1), fz(2), fz(3), fz(4)] are given. Conversely, the fact that the movement vectors can be represented as foregoing means that superposition of forces holds, therefore, the elastic body is a linear elastic body.

When the equation is represented as a matrix form, X=H×f, where H=[Mx(1); Mx(2); . . . ; Mz(4)]. The H is called a transfer function because the H is a map that transfers a force f to deformation x. The matrix form written with an element is the following.

$$\begin{bmatrix} m(1) \\ m(2) \\ m(3) \\ m(4) \\ n(1) \\ n(2) \\ n(3) \\ n(4) \end{bmatrix} = \begin{bmatrix} Hmx(1,1) & Hmz(1,1) & Hmx(1,2) & Hmz(1,2) & Hmx(1,3) & Hmz(1,3) & Hmx(1,4) & Hmz(1,4) \\ Hmx(2,1) & Hmz(2,1) & Hmx(2,2) & Hmz(2,2) & Hmx(2,3) & Hmz(2,3) & Hmx(2,4) & Hmz(2,4) \\ Hmx(3,1) & Hmz(3,1) & Hmx(3,2) & Hmz(3,2) & Hmx(3,3) & Hmz(3,3) & Hmx(3,4) & Hmz(3,4) \\ Hmx(4,1) & Hmz(4,1) & Hmx(4,2) & Hmz(4,2) & Hmx(4,3) & Hmz(4,3) & Hmx(4,4) & Hmz(4,4) \\ Hnx(1,1) & Hnz(1,1) & Hnx(1,2) & Hnz(1,2) & Hnx(1,3) & Hnz(1,3) & Hnx(1,4) & Hnz(1,4) \\ Hnx(2,1) & Hnz(2,1) & Hnx(2,2) & Hnz(2,2) & Hnx(2,3) & Hnz(2,3) & Hnx(2,4) & Hnz(2,4) \\ Hnx(3,1) & Hnz(3,1) & Hnx(3,2) & Hnz(3,2) & Hnx(3,3) & Hnz(3,3) & Hnx(3,4) & Hnz(3,4) \\ Hnx(4,1) & Hnz(4,1) & Hnx(4,2) & Hnz(4,2) & Hnx(4,3) & Hnz(4,3) & Hnx(4,4) & Hnz(4,4) \end{bmatrix} \begin{bmatrix} fx(1) \\ fz(1) \\ fx(2) \\ fz(2) \\ fx(3) \\ fz(3) \\ fx(4) \\ fz(4) \end{bmatrix}$$

where Hmx(x1, x2) represents a displacement amount in x-direction of m marker in a certain depth at a coordinate x=x1 with a unit force in the x-direction applied to a surface at a coordinate x=x2. Similarly, Hnz(x1, x2) represents a displacement amount in z-direction of n marker in a certain depth at a coordinate x=x1 with a unit force in the z-direction applied to a surface at a coordinate x=x2.

This is a simple multiplication of matrices where reference x is 1×8 matrix, reference H is 8×8 square matrix, and reference f comprises 1×8 components. Thus, f can be obtained from observed x by multiplying an inverse matrix of H. Namely, f=inv(H)×X (Equation 1) where inv represents inverse matrix (generalized matrix inverse).

The matrix form written with an element is the following.

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \\ Imx(1,1) & Imx(2,1) & Imx(3,1) & Imx(4,1) & Inx(1,1) & Inx(2,1) & Inx(3,1) & Inx(4,1) \\ Imz(1,2) & Imz(2,2) & Imz(3,2) & Imz(4,2) & Inz(1,2) & Inz(2,2) & Inz(3,2) & Inz(4,2) \\ Imx(1,3) & Imx(2,3) & Imx(3,3) & Imx(4,3) & Inx(1,3) & Inx(2,3) & Inx(3,3) & Inx(4,3) \\ Imz(1,4) & Imz(2,4) & Imz(3,4) & Imz(4,4) & Inz(1,4) & Inz(2,4) & Inz(3,4) & Inz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

where Imx(1,1) and the like represent each element of inv(H) and represent contribution of m(1) for calculating fx(1).

The important thing is that the number of observed data must be equal to or more than the number of unknowns when determining unknowns by using an inverse matrix defined by a transfer function. If the requirements are not met, it is quite difficult to obtain the inverse matrix, namely, the number of unknowns is redundant and the unknowns cannot be precisely obtained. In the example shown in FIG. 4, if there is only one marker layer, force vector components cannot be precisely determined because only four movement vector components are observed whereas distribution of eight force vectors is to be obtained (this is the case with the conventional surface distribution type tactile sensor). To solve this problem, the present invention employs two layers of differentially colored marker groups so as to increase the number of independent observed data up to eight by observing a movement of each marker in the two layered marker groups.

In case of three-dimensional space (where y-axis is added to the drawing), at a point, a force vector has three degrees of freedom, and a horizontal movement vector of markers has two degrees of freedom. If the number of sampling points is four, the number of unknowns f is twelve, where f=[fx(1), fy(1), fz(1), fx(2), fy(2), fz(2), fx(3), fy(3), fz(3), fx(4), fy(4), fz(4)], whereas the number of observed movement vectors is eight and is insufficient, where m=[mx(1), my(1), mx(2), my(2), mx(3), my(3), mx(4), my(4)].

By providing two layered markers, it is possible to obtain sixteen observed data by observing the layered markers and to determine twelve unknowns. Due to redundancy in the number of obtained information, robust extrapolation can be performed. Using the foregoing algorithms, the force vectors are extrapolated from the CCD image. Even with other measurement methods of the present invention using other types of marker configurations, independent observed information whose number is equal to or greater than the number of unknowns are collected using color coding, and it is possible to estimate and reconstruct force vectors by stably resolving an inverse problem.

[C] Transfer Function for Reconstructing Force Vector Distribution

From the foregoing description, it is essentially important for the optical tactile sensor of the present invention to obtain the transfer function (matrix H) representing the relationship between the surface stress and the internal strain of the elastic body. In this regard, the present optical tactile sensor is inherently different than the conventional matrix-type tactile sensors. Though the conventional matrix-type tactile sensor (the sensor by Shimojo, for example) comprises an elastic body layer provided on a sensor element, it only measures a force applied to each arrayed sensor element and does not calculate force vector distribution applied on an elastic body surface.

Next, a method of obtaining the transfer function will be described. Theory of elasticity basically leads an equation that holds between a force applied to a surface (x=0, $\Delta$x, y=0, $\Delta$y, z=0, $\Delta$z) of an internal microscopic region (a micro cube $\Delta x \Delta y \Delta z$, for example) and strain of the microscopic region (d$\Delta$x/dx, d$\Delta$y/dx, d$\Delta$z/dx, d$\Delta$x/dy, d$\Delta$y/dy, d$\Delta$z/dy, d$\Delta$x/dz, d$\Delta$y/dz, d$\Delta$y/dz). An overall elastic body is comprised of (spatially integrated) infinite number of the microscopic regions.

In an elastic body having a characteristic shape (a semi-infinite elastic body, for example), as a function defining a force applied to a surface and an internal strain, a function where the foregoing equation held in the microscopic region can hold in any regions of the internal portion of the elastic body has been found as a numerical equation. In this case, a matrix H can be obtained by substituting coordinates of finely divided elastic body surfaces and coordinates of internal markers into the function.

Here, the numerical equation is a function G by which the internal strain can be obtained from the surface stress in the form of m(x2, y2)=G(f(x1), x2, y2), where f(x1) represents surface stress and m(x2, y2) represent internal strain. For example, when a force is applied to a point 1 in FIG. 4, displacement of marker 2 can be obtained by m(2, y2)=G(f(1), 2, y2), where y2 is a known marker depth.

However, such characteristic shape is rare, for example, even with a spherical body, a function for the relationship between surface stress and internal strain has not been found. According to the related optical tactile sensor, a matrix H is obtained using the foregoing equation assuming that an elastic body is a semi-infinite elastic body. It is found that surface stress cannot be correctly obtained when the equation for semi-infinite elastic body is applied for an arbitrary curved surface such as a hemispherical surface. It is therefore necessary to associate a surface stress with an internal strain by any other means.

A first method is to associate a surface stress with an internal strain by numerical simulation. According to a commercially available elasticity simulation software, by dividing an elastic body into meshes, it is possible to numerically calculate elastic deformation that holds for the relationship between surface stress and strain of each mesh (above-mentioned microscopic region) and the relationship between the adjacent meshes where forces having the same magnitude are exerted at an interface. Therefore, by dividing the surface of the sensor into meshes, it is possible to calculate the movement amount of markers when a unit force is applied to each mesh in x-direction, y-direction and z-direction by simulation.

Figure 6:
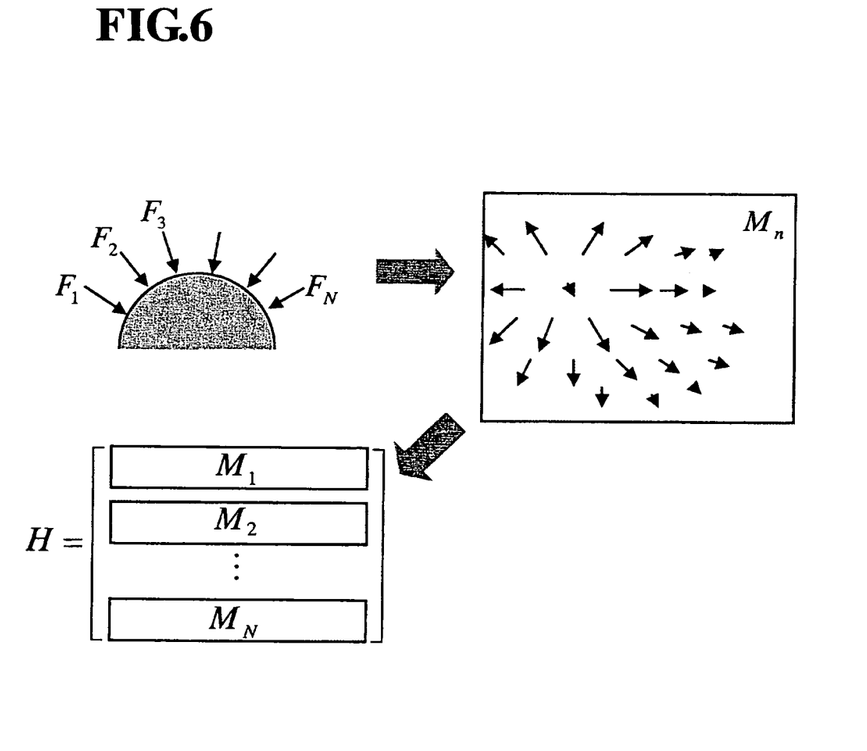
FIG. 6 is an explanatory drawing of a method for obtaining a transfer function used in force vector distribution reconstruction.

A second method is to actually apply a force to the surface as shown in FIG. 6. Forces F1, F2, F3, F4 . . . , Fn having known magnitude are applied to an arbitrary curved surface of elastic body. Movement vectors (Movements of markers caused by each known force) M1, M2, M3, M4, . . . , Mn of markers as to each force applied are measured and stored. F1 represents three vectors F1x, F1y, F1z and movement vectors of respective markers are given as M1x, M1y, M1z when these forces are applied. A matrix H is obtained from the forces having known magnitude and obtained information (movement vector). The second method will be explained in detail.

Firstly, numerous sampling points are discretely arranged on the surface of elastic body. In one preferable aspect, the sampling points are arranged so as to cover an overall area of the surface. In one aspect, numerous discrete sampling points are arranged (concentrically arranged in plan view) according to curvilinear coordinates. In another aspect, the sampling points are arranged to provide a grid arrangement in a plan view.

At each sampling point, information that associates forces having known magnitude applied in x-direction, y-direction, and z-direction with corresponding movement vectors of markers when the forces are applied is obtained. In one preferable method, forces having the predetermined magnitude are independently applied to each sampling point in x-direction, y-direction and z-direction, and each movement vector of markers is measured and stored. Orientations of x-direction, y-direction and z-direction of force vectors applied on the sampling points are not limited as long as an arbitrary force applied to the surface can be represented by using these force vectors.

In one aspect, a tangential plane is provided at a sampling point, x-direction and y-direction are determined in the orthogonal direction to each other in the plane, and z-direction is determined in an orthogonal direction as to the plane. Alternatively, x-y plane is set regardless of the shape of surface, and z-direction is set in an orthogonal direction as to the x-y plane.

Forces applied to each sampling point have known magnitude, and in one preferable aspect, a force with constant magnitude, 100 [gf] for example, is applied to the sampling point in x-direction, y-direction, and z-direction, respectively and movement vectors of each instance are measured. It is not necessary that forces applied to each sampling point have the same magnitude as long as the magnitude of each force is known. Movement vector of markers may be measured based on forces having different magnitudes, and later on, the magnitude of movement vector can be normalized.

As long as information that associates forces in x-direction, y-direction, and z-direction with movement vectors of markers eventually is obtained, directions of forces applied to each sampling point are not limited to x-direction, y-direction and z-direction. Assume that an elastic body is a linear elastic body, the following method is also considered. First, applying a force to a point in z-direction, and a movement amount of each marker is measured and stored. Next, applying a force to the point in xy-direction, and a component in x-direction can be obtained by subtracting the force component in z-direction from the x-z component. This is the same for the y-direction.

As foregoing, the matrix H can be obtained by simulation or measurement where the matrix H is the transfer function that associates force information F with information M as to the behavior of marker (movement information, for example). The optical tactile sensor comprises a memory device and a processor. The matrix H obtained is stored in the memory device. A marker image is obtained by a photographing device when an object contacts the transparent elastic body and an arbitrary force is applied to a surface of a sensor. A movement vector of marker is measured from the obtained marker image by the processor. The measured movement vector of marker is input to the matrix H and calculated by the processor, thereby outputting force vector that is applied to the surface of the elastic body.

[D] Computation Time Reduction Method

Here, if the number of elements of a matrix H becomes large, the time for calculating force distribution from movement information becomes long. This is due to use of movement information for all markers when obtaining force applied to a particular point. In actual fact, in the case of adopting the previously described algorithm, the H matrix becomes gigantic, and time is taken in matrix operation for equation 1. Giving one example, in the case of a mesh of 100×100, there are 10,000 observation points which means that H matrix becomes a gigantic matrix of 10,000×10,000. Generally, in the case of a sensor surface partitioned into N×N, since the number of observation points are N squared, the size of the H matrix becomes N squared by N squared. Thus, time of four times N is taken for matrix operation of equation 1. Accordingly, it becomes necessary to have a method for shortening the computation time.

The proposed method extracts a part of the H matrix and utilizes the same. As described above, a correspondence relationship for force applied to all lattice points and movement of all markers is described in the H matrix. However, as an actual problem, for example, it is possible to ignore the effect of marker provided that a distance between the force application points and the marker is sufficient. If this is done, for example, in FIG. 4 and FIG. 5, by assuming that it is acceptable to use only first to second markers in calculating f(1), and to use only first to third markers in calculating f(2), it is possible to make the size of the matrix small. A new matrix in this example is as follows.

Original equation 1 f=inv(H) x is as follows:

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} lmx(1,1) & lmx(2,1) & lmx(3,1) & lmx(4,1) & lnx(1,1) & lnx(2,1) & lnx(3,1) & lnx(4,1) \\ lmz(1,2) & lmz(2,2) & lmz(3,2) & lmz(4,2) & lnz(1,2) & lnz(2,2) & lnz(3,2) & lnz(4,2) \\ lmx(1,3) & lmx(2,3) & lmx(3,3) & lmx(4,3) & lnx(1,3) & lnx(2,3) & lnx(3,3) & lnx(4,3) \\ lmz(1,4) & lmz(2,4) & lmz(3,4) & lmz(4,4) & lnz(1,4) & lnz(2,4) & lnz(3,4) & lnz(4,4) \\ lmx(1,1) & lmx(2,1) & lmx(3,1) & lmx(4,1) & lnx(1,1) & lnx(2,1) & lnx(3,1) & lnx(4,1) \\ lmz(1,2) & lmz(2,2) & lmz(3,2) & lmz(4,2) & lnz(1,2) & lnz(2,2) & lnz(3,2) & lnz(4,2) \\ lmx(1,3) & lmx(2,3) & lmx(3,3) & lmx(4,3) & lnx(1,3) & lnx(2,3) & lnx(3,3) & lnx(4,3) \\ lmz(1,4) & lmz(2,4) & lmz(3,4) & lmz(4,4) & lnz(1,4) & lnz(2,4) & lnz(3,4) & lnz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

This equation becomes an equation as follows by ignoring contribution at places separated by distance.

$$\begin{bmatrix} fx(1) \\ fz(1) \\ fx(2) \\ fz(2) \\ fx(3) \\ fz(3) \\ fx(4) \\ fz(4) \end{bmatrix} = \begin{bmatrix} lmx(1,1) & lmx(2,1) & 0 & 0 & lnx(1,1) & lnx(2,1) & 0 & 0 \\ lmz(1,2) & lmz(2,2) & lmz(3,2) & 0 & lnz(1,2) & lnz(2,2) & lnz(3,2) & 0 \\ 0 & lmx(2,3) & lmx(3,3) & lmx(4,3) & 0 & lnx(2,3) & lnx(3,3) & lnx(4,3) \\ 0 & 0 & lmz(3,4) & lmz(4,4) & 0 & 0 & lnz(3,4) & lnz(4,4) \\ lmx(1,1) & lmx(2,1) & 0 & 0 & lnx(1,1) & lnx(2,1) & 0 & 0 \\ lmz(1,2) & lmz(2,2) & lmz(3,2) & 0 & lnz(1,2) & lnz(2,2) & lnz(3,2) & 0 \\ 0 & lmx(2,3) & lmx(3,3) & lmx(4,3) & 0 & lnx(2,3) & lnx(3,3) & lnx(4,3) \\ 0 & 0 & lmz(3,4) & lmz(4,4) & 0 & 0 & lnz(3,4) & lnz(4,4) \end{bmatrix} \begin{bmatrix} m(1) \\ m(2) \\ m(3) \\ m(4) \\ n(1) \\ n(2) \\ n(3) \\ n(4) \end{bmatrix}$$

Places with zero are points separated by distance that should be ignored. Calculation at higher speed can be effectuated because there is no need to compute them. This speed increase provides an accelerated effect as the lattice size N becomes larger, as described previously.

Figure 7:
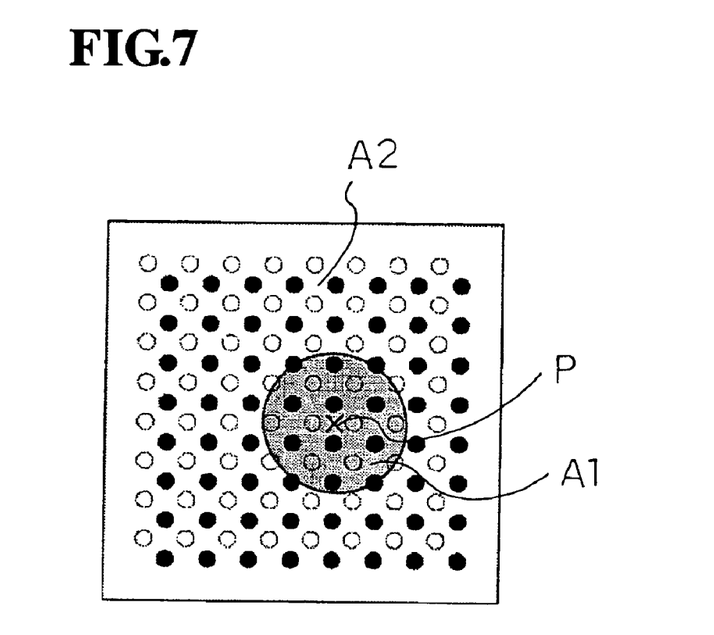
FIG. 7 is an explanatory drawing of a method of shortening computation time for force vector reconstruction.
Figure 8:
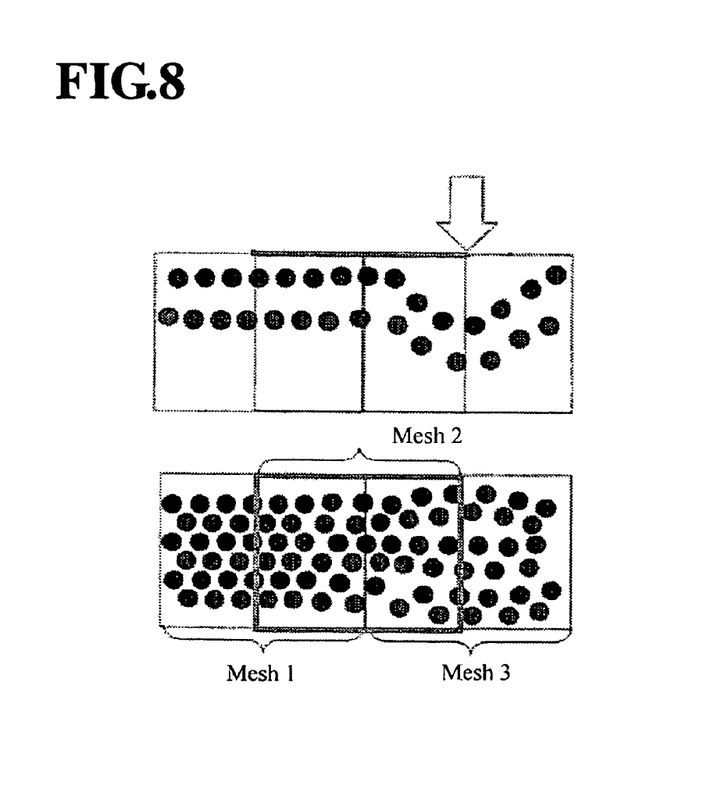
FIG. 8 is a drawing showing effect of force from outside an extracted region, the upper drawing being a side view of a transparent elastic body in which markers are embedded, the lower drawing being a plan view of the same. Here, since a distance between force sampling points is small compared to the extracted region, respective extracted regions for adjacent force sampling points are overlapped (refer to meshes 1, 2 and 3).

This is equivalent to using an extracted surface area containing a place where it is desired to obtain force vectors. In FIG. 7, P is a place where it is desired to obtain a force vector, and the circle region A1 is an area of markers used to obtain force vectors. With the situation in the drawing, in a two dimensional image of the entire contact surface, a region in the vicinity of a place where it is desired to obtain force vector distribution is set. Here, in the event that a region in the vicinity of a place where it is desired to obtain force vectors is set, the neighboring region is not necessarily determined based on only a distance in the two dimensional image. Namely, a distance between force application points and a marker is a spatial distance, and in cases such as where marker groups are layered inside an elastic body, there may be cases where it is desirable to consider depth with the marker is provided. Specifically, in a sensor having a planar contact surface, if the contact surface is the x-y plane, a neighboring region to the place where it is desired to obtain force vectors is not necessarily determined using only the distance on the x-y plane, and it is also possible to determine with a three dimensional distance including the z direction. If there is a case where the z direction distance can be ignored, the proximate region can be set based on the two dimensional distance on the x-y plane.

In the case of a contact surface having an arbitrary curved surface, contribution of places separated by a distance is not always small. Therefore another method of shortening computation time is proposed. First of all, a transfer function (an inverse matrix) is obtained by actual measurement or simulation. A method for producing this type of transfer function has already been described. For example, when looking at elements of a matrix for a transfer function based on actual measurement, if a particular element of the matrix approaches zero, a marker corresponding to the element can be considered to be a marker that can be ignored for the purpose of obtaining a particular force vector. It is possible to compute the force vector with sections where the particular element of the matrix of the transfer function approaches zero automatically omitted from the computation. For example, a threshold representing an index of the extent to which it is possible to ignore in force vector reconstruction is set for the matrix elements, and the value of matrix elements having a value smaller than the threshold value are made zero.

Further, improvement for the computation shortening method will be described. The inventors have undertaken committed research, an in the case of using the above described computation shortening method, it was understood that there were cases where precision of measuring force vectors was lowered. According to the above described computation shortening method, it is considered that computation is hardly affected by movement of a marker separated from a point where it is desired to obtain a force. Only information for a marker inside a circle region A1 extracted in FIG. 7 is used, and information relating to a marker of a section A2 outside the extracted region is not used.

Nevertheless, in actual fact, a marker inside an extracted region also moves due to force outside the extracted region. Movement of the marker due to force from outside the extracted region is also mistakenly calculated as force generated inside the region, causing a problem of drop in precision. In order to solve this type of drawback, the following method has been improved.

With respect to the point of extracting a particular region of the image, it is the same as for the foregoing computation shortening method. The foregoing method deals with only information inside the extracted region while the improved method provides sampling points outside the extracted region for force to be computed. With respect to movement of the marker, only information inside the extracted region is handled. The sampling points are points for taking into consideration the effect of force from the outside region. That is, movement of a marker inside the extracted region can be affected to a certain extent by force applied outside the extracted region. At the time of reconstructing force vectors based on movement information of markers inside the extracted region, by computing not only force acting inside the extracted region force but also force acting outside the extracted region, force acting inside the extracted region is reconstructed while taken into consideration force acting outside the extracted region.

Also, force sampling points outside the region are set sparsely with distance from the extracted region. This is because it is considered that representation is possible with fewer sampling points because the effect with becomes slighter with increased distance of separation from the region. If description is given based on FIG. 9, a small region corresponding to sampling points of 5×5 points is set in an image of a tactile sense section. Sampling points are set densely inside the small region. Sampling points for force are also arranged outside the small region. Sampling points for force outside the small region are arranged more sparsely with distance from the small region. With the example in the drawing, at sites close to the small region, sampling points are arranged densely, at the same density as inside the small region, and as separation from the small region increases, the sampling points are arranged more sparsely.

Figure 9:
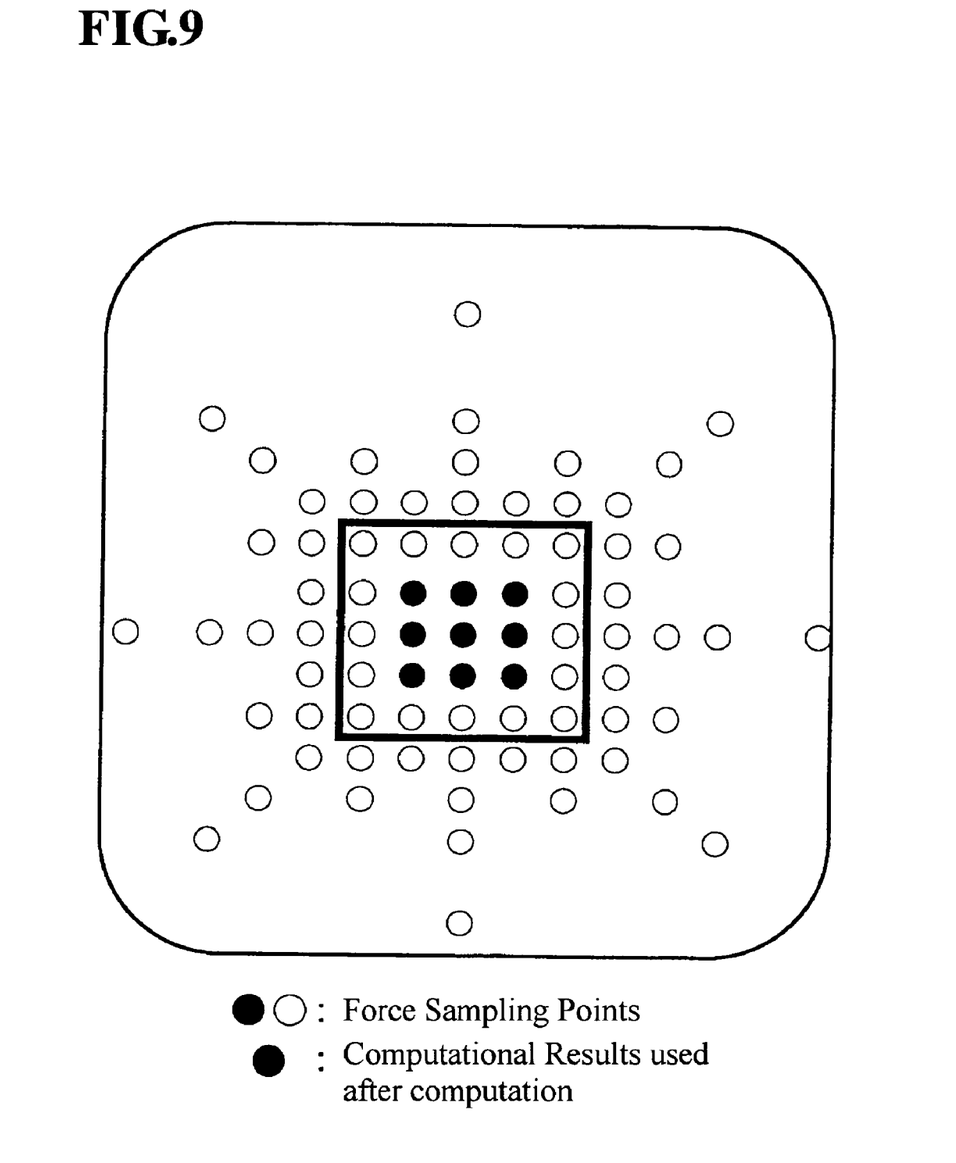
FIG. 9 is a conceptual drawing of an improved method of the computation shortening method. In the drawing, black circles and white circles represent force sampling points, and black circles represent computational results used after computation.
Figure 10:
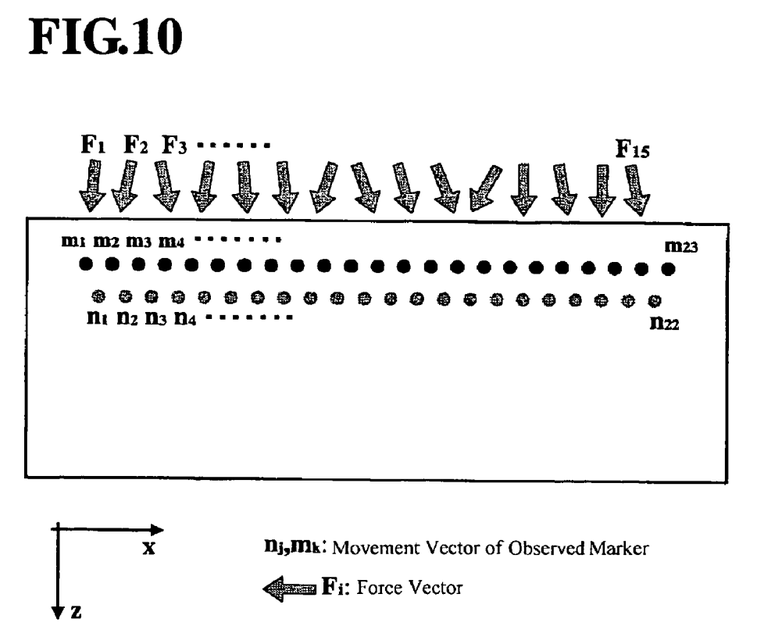
FIG. 10 is a drawing showing an increased number of markers.
Figure 11:
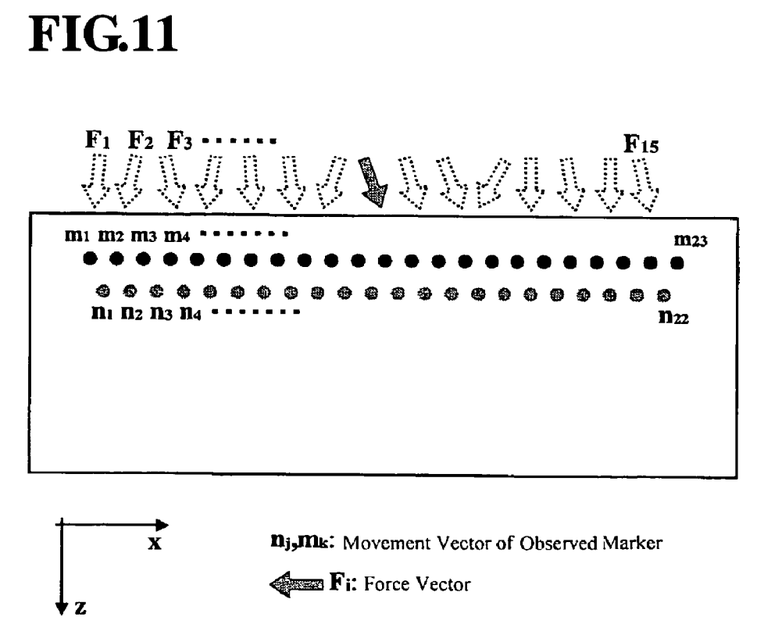
FIG. 11 is a drawing showing an increased number of markers, in which movement of a marker caused relative to the force applied to one point is focused.

Then, force vectors for sampling points arranged inside and outside the small region are calculated using movement information of markers inside the small region. Of the calculated force vectors, only the results for at least some of the force vectors inside the small region are adopted and saved as final computation results. With the example in FIG. 9, force vectors for sampling points for force arranged 3×3 inside the small region of 5×5 are saved as final calculation results. Sampling points outside the small region and sampling points not adopted inside the small region are discarded. The extracted small region is then sequentially shifted as obtaining force vectors for the region, so that force vector distribution for the entire measurement region of the sensor is obtained. In FIG. 9, force vectors for a part of sampling points of the small region are utilized, but it is also possible to utilize force vectors for all sampling points inside the small region. Also, in FIG. 9, force vectors for a plurality of sampling points for a part of the small region are utilized, but it is also possible to utilize only force vectors for one sampling point inside the small region. In FIG. 9, a small region of 5×5 points is shown, but the size of the extracted region is not limited. Using this improved method, compared to the above described computation shortening method, the amount of computation may be increased but there is sufficient shortening of the computation time compared to before adopting a speed increasing method.

Description will be given for an improved method, based on FIG. 10 to FIG. 13. With FIG. 10, for ease of description of the improved method, the number of marker points is increased compared to that shown in FIG. 4 and FIG. 5. Due to the increased number of marker points, there is a corresponding increase in the number of elements in the equations, and for that reason, in FIG. 11, only x, z directional movements for a marker n corresponding to force for one particular point is shown. This is equivalent to a situation where only sections corresponding to elements Imx(1,1), Imx(2,1), Imx(3,1), Imx(4,1), Imx(1,2), Imx(2,2), Imx(3,2) and Imx(4,2) of matrix inv(H) in equation 3 are extracted and the number of marker points is increased. This becomes as follows when represented as an equation. F on the left side represents force, while m on the right side represents movement vector, and the left term of the right side represents elements extracted from inv(H) corresponding to force F on one particular point and marker m.

$$\begin{bmatrix} F_{x8} \\ F_{z8} \end{bmatrix} = \begin{bmatrix} x_1 & x_2 & x_3 & x_4 & x_5 & x_6 & x_7 & x_8 & x_9 & x_{10} & x_{11} & x_{12} & x_{13} & x_{14} & x_{15} & x_{16} & x_{17} & x_{18} & x_{19} & x_{20} & x_{21} & x_{22} & x_{23} \\ z_1 & z_2 & z_3 & z_4 & z_5 & z_6 & z_7 & z_8 & z_9 & z_{10} & z_{11} & z_{12} & z_{13} & z_{14} & z_{15} & z_{16} & z_{17} & z_{18} & z_{19} & z_{20} & z_{21} & z_{22} & z_{23} \end{bmatrix} \begin{bmatrix} m_1 \\ m_2 \\ m_3 \\ m_4 \\ m_5 \\ m_6 \\ m_7 \\ m_8 \\ m_9 \\ m_{10} \\ m_{11} \\ m_{12} \\ m_{13} \\ m_{14} \\ m_{15} \\ m_{16} \\ m_{17} \\ m_{18} \\ m_{19} \\ m_{20} \\ m_{21} \\ m_{22} \\ m_{23} \end{bmatrix}$$

Figure 12:
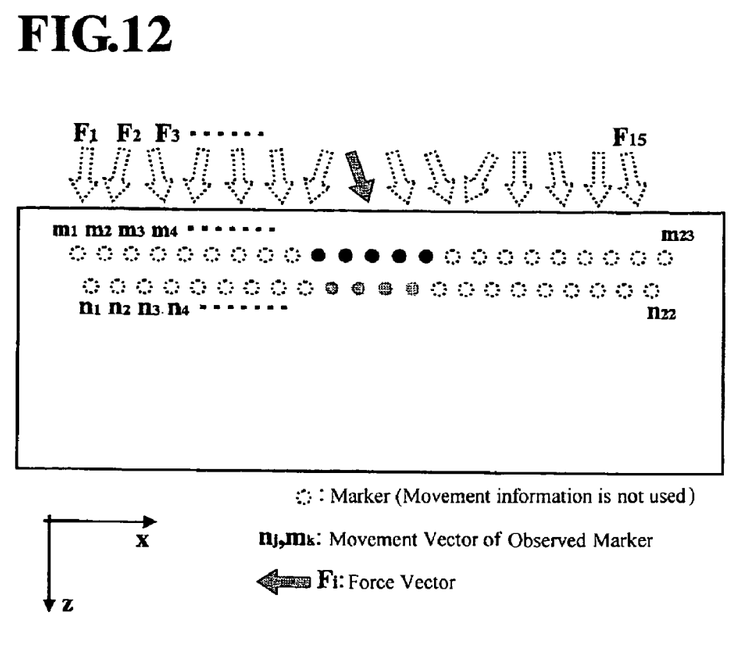
FIG. 12 is a drawing for describing the speed increasing method shown in FIG. 7, based on FIG. 11.

The speed increasing method before improvement uses only movement information of markers that exists close to points to which force being obtained is applied, and as shown in FIG. 12, only movement information for markers $m_{10}$ to $m_{14}$ is used. Represented as an equation this then becomes as follows.

$$\begin{bmatrix} F_{x8} \\ F_{z8} \end{bmatrix} = \begin{bmatrix} 0 & 0 & 0 & 0 & 0 & 0 & 0 & 0 & 0 & x_{10} & x_{11} & x_{12} & x_{13} & x_{14} & 0 & 0 & 0 & 0 & 0 & 0 & 0 & 0 & 0 \\ 0 & 0 & 0 & 0 & 0 & 0 & 0 & 0 & 0 & z_{10} & z_{11} & z_{12} & z_{13} & z_{14} & 0 & 0 & 0 & 0 & 0 & 0 & 0 & 0 & 0 \end{bmatrix} \begin{bmatrix} m_1 \\ m_2 \\ m_3 \\ m_4 \\ m_5 \\ m_6 \\ m_7 \\ m_8 \\ m_9 \\ m_{10} \\ m_{11} \\ m_{12} \\ m_{13} \\ m_{14} \\ m_{15} \\ m_{16} \\ m_{17} \\ m_{18} \\ m_{19} \\ m_{20} \\ m_{21} \\ m_{22} \\ m_{23} \end{bmatrix}$$

Movement information for markers of from $m_1$ to $m_9$ and from $m_{15}$ to $m_{23}$ in the above equation do not contribute to force F being obtained, and as described in the following, it is possible to reduce the number of elements.

$$\begin{bmatrix} F_{x8} \\ F_{z8} \end{bmatrix} = \begin{bmatrix} x_{10} & x_{11} & x_{12} & x_{13} & x_{14} \\ z_{10} & z_{11} & z_{12} & z_{13} & z_{14} \end{bmatrix} \begin{bmatrix} m_{10} \\ m_{11} \\ m_{12} \\ m_{13} \\ m_{14} \end{bmatrix} = invH_8 \begin{bmatrix} m_{10} \\ m_{11} \\ m_{12} \\ m_{13} \\ m_{14} \end{bmatrix}$$

Figure 13:
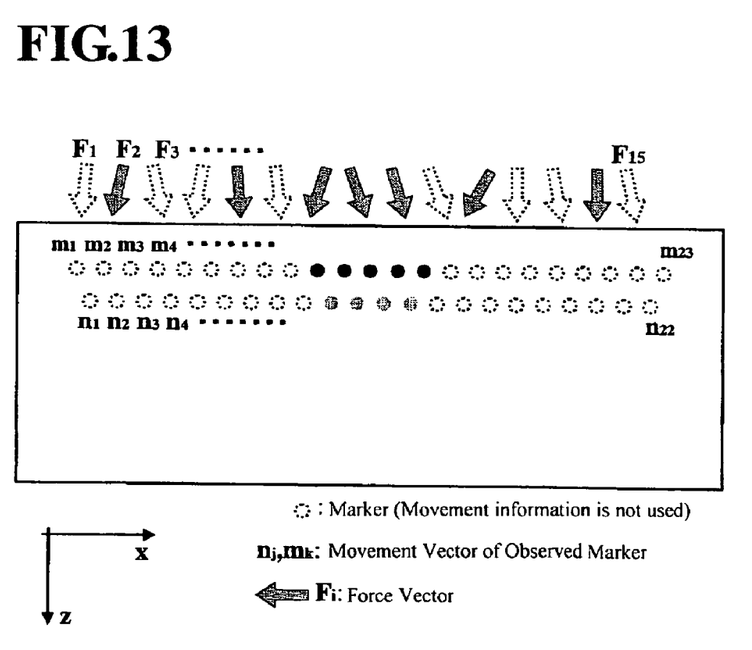
FIG. 13 is a drawing for describing an improved method, based on FIG. 11.

In this respect, if the speed increasing method after improvement is illustrated, it is as shown in FIG. 13. That is, not only $F_8$, but also $F_2$, $F_5$, $F_9$, $F_{11}$ and $F_{14}$ are arranged as force sampling points. Also, if shown as an equation, there is an increase in elements related to force F, and it is possible to represent as follows.

$$\begin{bmatrix} F_{x2} \\ F_{z2} \\ F_{x5} \\ F_{z5} \\ F_{x7} \\ F_{z7} \\ F_{x8} \\ F_{z8} \\ F_{x9} \\ F_{z9} \\ F_{x11} \\ F_{z11} \\ F_{x14} \\ F_{z14} \end{bmatrix} = \begin{bmatrix} invH_2 \\ invH_5 \\ invH_7 \\ invH_8 \\ invH_9 \\ invH_{11} \\ invH_{14} \end{bmatrix} \begin{bmatrix} m_{10} \\ m_{11} \\ m_{12} \\ m_{13} \\ m_{14} \end{bmatrix}$$

In the computed force vectors, only force vectors for $F_{x8}$ and $F_{z8}$ are utilized.

INDUSTRIAL APPLICABILITY

The present invention can be applied widely to tactile sensors, and in particular can be preferably used in a sensor that requires real time sensing.

The invention claimed is:

1. A force vector reconstruction method that uses an optical tactile sensor, said sensor having a tactile portion comprising a transparent elastic body and a plurality of marker groups provided in said body, each marker group being comprised of a number of colored markers, with markers constituting different marker groups having different colors for each group, said method comprising the steps of:
   obtaining a marker image by taking an image of behavior of colored markers when an object contacts a contact surface of the elastic body;
   obtaining information relating to the marker behavior from the marker image, said information being more than the number of force vectors to be obtained; and
   obtaining force vectors as outputs by inputting said obtained information relating to the marker behavior to a transfer function,
   wherein said obtaining force vectors comprises:
     arranging one or more sampling points at a position where it is desired to obtain force vectors and arranging a plurality of sampling points around said position;
     calculating force vectors acting at both the sampling points at said position and the sampling points around said position using information relating to marker behavior at and/or proximate to said position; and
     adopting only force vectors acting at the sampling points at said position in the calculated force vectors and discarding force vectors acting at the sampling points around said position in the calculated force vectors.

2. The method of claim 1, wherein the sampling points are arranged more sparsely as the distance from said position increases.

3. The method of claim 1, wherein said transfer function is made based on actual measurement.

4. A force vector reconstruction method that uses an optical tactile sensor, said sensor having a tactile portion comprising a transparent elastic body and a plurality of marker groups provided in said body, each marker group being comprised of a number of colored markers, with markers constituting different marker groups having different colors for each group, said method comprising the steps of:
- obtaining a marker image by taking an image of behavior of colored markers when an object contacts a contact surface of the elastic body;
- obtaining information relating to the marker behavior from the marker image, said information being more than the number of force vectors to be obtained;
- setting a small region of a specified size in the marker image and arranging a plurality of force vector sampling points inside and outside the small region;
- calculating force vectors acting on the sampling points both inside the small region and outside the small region by supplying marker information inside the small region to a transfer function; and
- adopting force vectors acting on at least some sampling points of the plurality of sampling points arranged inside the small region and discarding the remaining calculated force vectors acting on the remaining sampling points.

5. The method of claim 4, wherein the sampling points are arranged densely inside the small region, and arranged sparsely with distance from the small region.

6. A force vector reconstruction device that uses an optical tactile sensor, said sensor having a tactile portion comprising a transparent elastic body and a plurality of marker groups provided in said body, each marker group being comprised of a number of colored markers, with markers constituting different marker groups having different colors for each group, said device comprising:
- means for obtaining a marker image by taking an image of behavior of colored markers when an object contacts a contact surface of the elastic body;
- means for obtaining information relating to the marker behavior from the marker image, said information being more than the number of force vectors to be obtained;
- means for setting a small region of a specified size in the marker image and arranging a plurality of force vector sampling points inside and outside the small region;
- means for calculating force vectors acting on the sampling points both inside the small region and outside the small region by supplying marker information inside the small region to a transfer function; and
- means for adopting force vectors acting on at least some sampling points of the plurality of sampling points arranged inside the small region and discarding the remaining calculated force vectors acting on the remaining sampling points.

7. The device of claim 6, wherein the sampling points are arranged densely inside the small region, and arranged sparsely with distance from the small region.

8. The device of claim 6, wherein said device comprises means for storing the transfer function.

9. In a force vector reconstruction device that uses an optical tactile sensor, said sensor having a tactile portion comprising a transparent elastic body and a plurality of marker groups provided in said body, each marker group being comprised of a number of colored markers, with markers constituting different marker groups having different colors for each group, a program for causing a computer constituting said force vector reconstruction device as:
- means for obtaining a marker image by taking an image of behavior of colored markers when an object contacts a contact surface of the elastic body;
- means for obtaining information relating to the marker behavior from the marker image, said information being more than the number of force vectors to be obtained;
- means for setting a small region of a specified size in the marker image and arranging a plurality of force vector sampling points inside and outside the small region;
- means for calculating force vectors acting on the sampling points both inside the small region and outside the small region by supplying marker information inside the small region to a transfer function; and
- means for adopting force vectors acting on at least some sampling points of the plurality of sampling points arranged inside the small region and discarding the remaining calculated force vectors acting on the remaining sampling points.

10. The program of claim 9, said program further causing said computer to arrange sampling points densely inside the small region and to arrange sampling points sparsely with distance from the small region.

* * * * *